United States Patent [19]

Anderson

[11] Patent Number: 4,897,247

[45] Date of Patent: Jan. 30, 1990

[54] TREATMENT OF EXHAUST GASES TO REDUCE MULTI-VALENT HEAVY METALS

[75] Inventor: Donald R. Anderson, Los Alamitos, Calif.

[73] Assignees: B. Richard Sacks, Van Nuys; Joseph L. Feeney, Vernon, both of Calif.

[21] Appl. No.: 194,294

[22] Filed: May 16, 1988

[51] Int. Cl.$^4$ ............................................. C01B 17/00
[52] U.S. Cl. ............................ 423/210; 204/DIG. 13
[58] Field of Search ...................... 423/210, 215.5, 57; 210/913; 204/DIG. 13

[56] References Cited

U.S. PATENT DOCUMENTS

| | | | |
|---|---|---|---|
| 3,966,889 | 6/1976 | Kakuta et al. | 423/210 |
| 4,044,098 | 8/1977 | Miller et al. | 423/210 |
| 4,462,911 | 7/1984 | Samhaber | 210/913 |
| 4,462,968 | 7/1984 | Tazuma et al. | 423/242 A |
| 4,731,187 | 3/1988 | Moriya et al. | 210/913 |

FOREIGN PATENT DOCUMENTS

| | | | |
|---|---|---|---|
| 49-27057 | 3/1974 | Japan | 210/913 |
| 49-64557 | 6/1974 | Japan | 423/210 |
| 53-110983 | 9/1978 | Japan | 423/210 |
| 55-38036 | 10/1980 | Japan | 204/DIG. 13 |
| 57-84722 | 5/1982 | Japan | 423/210 |

Primary Examiner—Robert L. Stoll
Assistant Examiner—Wayne A. Langel
Attorney, Agent, or Firm—Plante, Strauss & Venderburgh

[57] ABSTRACT

There is disclosed a treatment of exhaust gases containing detectable quantities of multivalent heavy metals in high oxidation states by introducing a sulfur reductant into contact with the exhaust gases and maintaining the contact of the sulfur reductant with the exhaust gases under appropriate conditions to favor the reduction of the heavy metal to an harmless, lower oxidation state. Sulfur dioxide is preferred for this treatment. After the treatment with the sulfur reductant, the exhaust gases are treated to remove the excess or residual amounts of the sulfur reductant and the compounds of higher oxidation states of the sulfur which have been formed by the reduction of the heavy metal. When sulfur dioxide is used, the exhaust gases can be passed into contact with an aqueous alkaline solution which absorbs oxides of sulfur, such as sulfur dioxide and trioxide from the exhaust gases. Suitable solutions for this purpose are aqueous solutions of strong bases such as sodium hydroxide, calcium hydroxide, ammonium hydroxide, etc.

9 Claims, 1 Drawing Sheet

TREATMENT OF EXHAUST GASES TO REDUCE MULTI-VALENT HEAVY METALS

BACKGROUND OF THE INVENTION

1. Field of Invention

This invention relates to a method for treatment of exhaust gases and, in particular, to the treatment of gases containing measurable quantities of multivalent heavy metals in high oxidation states to reduce the metals to relatively harmless, lower oxidation states.

2. Brief Statement of the Prior Art

A number of industrial processes utilize multivalent heavy metals in various oxidation states. In these processes, detectable quantities of compounds of the heavy metals can become entrained in the exhaust gases from the industrial processes, usually in solution as droplets, and when the solvent is evaporated from the droplets, as very fine solids. A classic example of a heavy metal is chromium which is present in its hexavalent oxidation state in exhaust gases from chromium plating operations. Chromium plating is used for many applications, including chromium plating for decorative purposes to impart luster and scratch resistance to metal surfaces, as well as to for imparting hardness and wear resistance to mechanical parts. Commonly, chromium is electrolytically plated from an aqueous electrolyte of the salts of this metal. During these plating operations, a detectable quantity of chromium in the hexavalent oxidation state is entrained from the electrolyte in the gases exhausted from chromium plating plants. Although the quantities of chromium which are vaporized in this manner may be exceedingly small, the relative high toxicity of the metal in its hexavalent oxidation state and the great advances which have been made in detection of minute quantities of metals in gases, are resulting in exceedingly stringent standards for permissible levels of this metal.

Although many of the heavy metals, such as chromium, are objectionable in their higher oxidation states, they can be relatively harmless if reduced to lower oxidation states. Such conversion, then, provides a solution to the potential hazard and environmental threat presented by these metals. Accordingly, there is a need for a cost efficient treatment of exhaust gases for the complete reduction of multivalent heavy metals, such as hexavalent chromium, to harmless, lower oxidation states.

BRIEF STATEMENT OF THE INVENTION

This invention comprises a treatment of exhaust gases containing detectable quantities of multivalent heavy metals in high oxidation states, which comprises introducing a sulfur reductant into contact with the exhaust gases and maintaining the contact of the sulfur reductant with the exhaust gases under appropriate conditions to favor the reduction of the heavy metal to an harmless, lower oxidation state. As used herein, sulfur reductant is an agent which includes sulfur in a valence state which is less than hexavalent. Elemental sulfur, or compounds or oxides of divalent and tetravalent sulfur can be used. Examples of useful sulfur reductants include: sulfur, hydrogen sulfide, ammonium sulfide, sulfurous acid, ammonium sulfite, ammonium bisulfite, sodium sulfite, sodium bisulfite, thiosulfuric acid, ammonium thiosulfide, etc. The selection of a suitable sulfur reductant for the treatment is influenced by the gas contacting treatment which will be used. Thus, elemental sulfur would require some gas/solid contacting treatment. Use of sulfur compounds will usually require a gas/liquid contacting treatment in which the salts are dissolved in an aqueous solution of sulfurous acid or its sulfite and bisulfite salts.

As sulfur dioxide is readily available, and can be released as a gas in the exhaust gas stream, it is preferred for this treatment.

After the treatment with the sulfur reductant, the exhaust gases are treated to remove the excess or residual amounts of the sulfur reductant and the compounds of higher oxidation states of the sulfur which have been formed by the reduction of the heavy metal. When sulfur dioxide is used, the exhaust gases can be passed into contact with an aqueous alkaline solution which absorbs oxides of sulfur, such as sulfur dioxide and trioxide from the exhaust gases. Suitable solutions for this purpose are aqueous solutions of strong bases such as sodium hydroxide, calcium hydroxide, ammonium hydroxide, etc.

BRIEF DESCRIPTION OF THE DRAWINGS

The invention will be described with reference to the FIGURES of which.

DESCRIPTION OF THE PREFERRED EMBODIMENT

The invention comprises the treatment of exhaust gases with a sulfur reductant, and the removal of excess sulfur reductant and more highly oxidized states of the sulfur reductant from the treated gases.

The exhaust gases which are treated are exhaust gases containing detectable quantities of a multivalent heavy metal in an oxidation state having an oxidation potential more positive than the sulfur reductant, whereby the sulfur reductant functions as a reducing agent.

The contacting is maintained under conditions which favor the oxidation of the sulfur reductant to a higher oxidation state, and reduction of the heavy metal to a lower oxidation state. Generally, contacting under acidic conditions, i.e., at pH values from about 2 to 6.8, are preferred to insure completion of the oxidation/reduction reaction. The reaction will proceed quite quickly, and reaction times of a few seconds to 5 minutes will be sufficient for completion. Generally, this will not require any reaction vessel, as the reaction can be completed in the exhaust gas line leading from the process to the stack.

The invention is of particular usefulness to treat exhaust gases and reduce chromium from a hexavalent oxidation state to a lower, typically trivalent, oxidation state in those gases. Detectable quantities, i.e., quantities in excess of about one part per billion of chromium in its hexavalent oxidation state, can be generated in exhaust gases from various industrial processes which utilize or treat chromium. The most common of such industrial processes is the electrolytic plating of chromium on metal surfaces, a process which is practiced for imparting very hard, scratch resistant coatings to metal surfaces.

Figure 1:
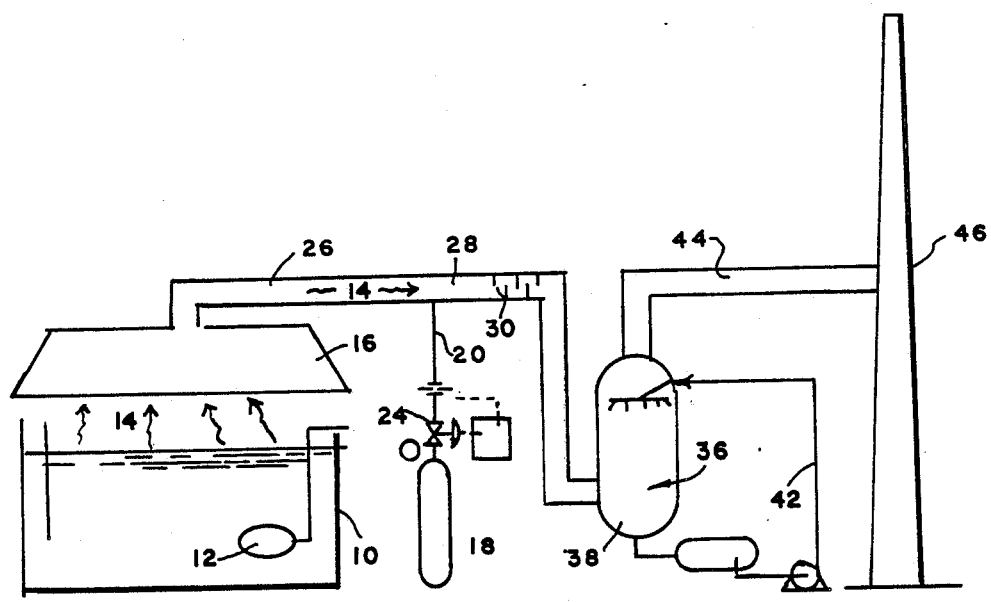
FIG. 1 is a schematic flow diagram of the treatment of the invention using a gaseous sulfur reductant such as sulfur dioxide.

Referring now to FIG. 1, there is depicted a schematic flow diagram of the process as applied treatment of the exhaust gases from a typical industrial process utilizing chromium. In this process, an electrolyte bath 10 containing chromium salts is used for the processing of metal parts 12. During the plating operation, there is a very small, but finite air entrainment of the compounds of chromium in its hexavalent oxidation state which is sufficient to generate a vapor stream 14 that contains detectable quantities of the chromium.

In most operations, the electrolyte bath 10 is located beneath an exhaust hood 16 which is evacuated and the off-gases are subjected to various treatments prior to exhausting to the atmosphere. The difficulty with most commercial gas treatment facilities, such as wet gas scrubbers, Cottrell precipitators, bag houses and the like, is that they are not effective in reducing the quantities of chromium to less than the extremely low detectable amounts. When the metal is present in its hexavalent state, any detectible quantities of the metal can be objectionable contaminants to the environment. Accordingly, it is necessary that some method be applied to treat the exhaust gases and reduce the hexavalent chromium to a lower oxidation state in which the metal is relatively harmless.

This invention comprises a treatment of the exhaust gases 14 by the introduction of sulfur dioxide from a supply 18 through a line 20 into direct contact with the exhaust gases 14. Sulfur dioxide is commercially available for this purpose in compressed, liquid form and a suitable technique simply comprises the automated metering of sulfur dioxide through a flow valve 24 set by a flow controller 22 into the exhaust line 26 from the chromium plating operation. The reaction is completed in the gas transfer line 28 through which the mixture of sulfur dioxide and exhaust gases is passed. If necessary, the transfer line can be provided with multiple baffles 30 for providing a tortuous path, thereby ensuring sufficient turbulence for adequate mixing.

The treatment which is effected at mild temperatures from about ambient to 700° F., preferably 75°–150° F. Adequate contact time, typically from about 3 seconds to about 1 minute, is provided by providing a transfer line 28 with sufficient diameter to insure the complete reduction of the hexavalent chromium.

After passing through the transfer line 28, the exhaust gases are passed to a treatment for the separation of sulfur compounds from the exhaust gases prior to exhausting the gases to the atmosphere. For this purpose a wet scrubber 36 can be used. This scrubber includes a contacting vessel 38 into which the exhaust gases are introduced by line 40 for countercurrent passage to an aqueous alkaline solution which is introduced into the upper portions of vessel 38 by line 42. Very suitable for this purpose are dilte (from 3 to 10 weight percent) aqueous solutions of sodium hydroxide, calcium hydroxide, or ammonium hydroxide. The wet scrubbing of the exhaust gases will be effective to remove any excess or residual amounts of sulfur dioxide as well as any sulfur trioxide which is formed by the reduction of the hexavalent chromium. Although this treatment may also effect removal of some of the chromium from the exhaust gases, the complete removal of chromium from the exhaust gases is not necessary as the chromium has been reduced to an harmless state, usually chromium in its trivalent oxidation state. The scrubbed exhaust gases can then be passed through line 44 to the exhaust stack 46.

Figure 2:
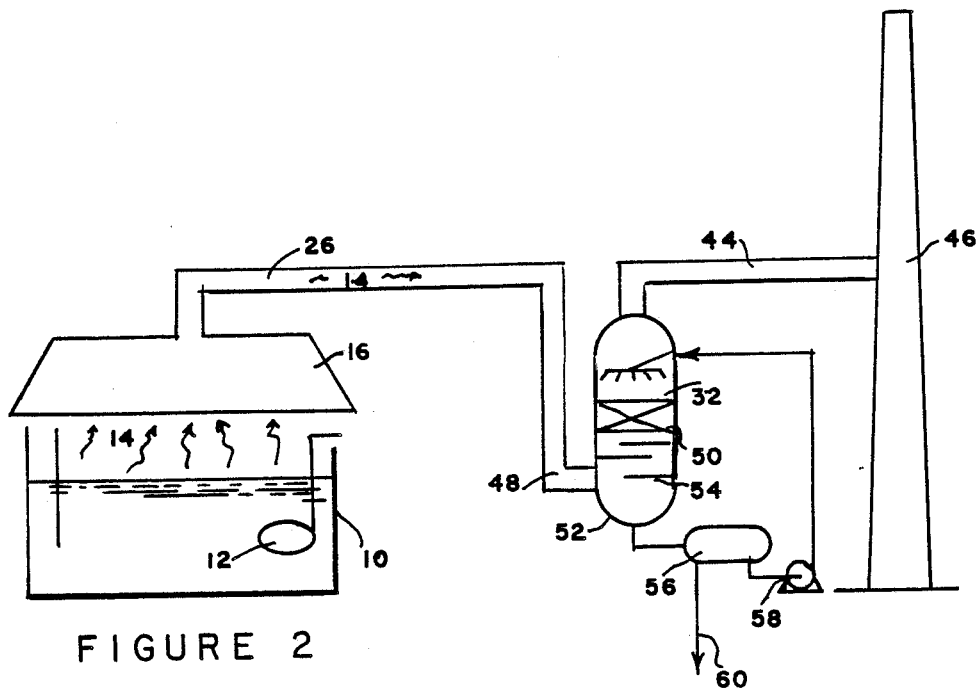
FIG. 2 is a schematic flow diagram of the treatment of the invention using an aqueous solution of a sulfur reductant such as a soluble bisulfite salt.

Referring now to FIG. 2, the reaction can be practiced using an aqueous solution of a sulfite or bisulfite salt as the reducing agent. In this application, the exhaust gases 14 from the chromium plating operation are passed through line 48 directly to a wet scrubber 50 where the gases are introduced into vessel 52 for contacting with an aqueous solution of a sulfite or bisulfite salt, e.g., sodium bisulfite. For this purpose, aqueous solutions containing from 3 to about 15 weight percent of the sulfite or bisulfite salt are preferred. The gases are passed through the wet scrubber vessel 52 in countercurrent contact with the aqueous bisulfite solution which is introduced into the upper end of vessel 52. If desired, the vessel can contain packing, or baffles 54 to enhance the mixing of the liquid and gases. Also, if desired, the reaction chamber 28 can be filled or partially filled with a suitable acidic contact solid 32 such as an acid-charged zeolite, or ion exchange solids, etc., to promote the oxidation/reduction reaction. The aqueous sulfite or bisulfite solution is collected in vessel 56 and recycled by pump 58 for further contacting. A bleed stream can be removed through line 60 and replenished with fresh aqueous bisulfite solution to maintain the activity of the bisulfite solution in the process.

The exhaust gases after passing into contact with the bisulfite solution are then passed through line 62 and into the atmosphere through the exhaust stack 64.

The reactions which occur in the process are as follows:

Dry State:
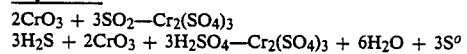
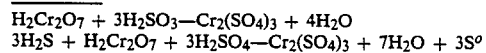
Wet State:
$H_2Cr_2O_7 + 3H_2SO_3 \rightarrow Cr_2(SO_4)_3 + 4H_2O$
$3H_2S + H_2Cr_2O_7 + 3H_2SO_4 \rightarrow Cr_2(SO_4)_3 + 7H_2O + 3S°$ In the above reactions, sulfuric acid is used. Any other strong mineral acid, such as hydrochloric acid, nitric acid, etc. can also be used.

Although the invention has been described with particular reference to treatment of exhaust gases containing chromium in its hexavalent oxidation state, the treatment can also be effective in reducing any of the various multi-valent heavy metals which are in oxidation states that are more positive than sulfur dioxide or an aqueous solution of a bisulfite salt. Examples of various metals to which this process could be thus applied to include treatment of exhaust gases containing vanadium in its pentavalent oxidation state, nickel in its tetravalent state, iron in its trivalent state, cobalt in its trivalent state, tantalum in its pentavalent state, molybdenum and tungsten in their hexavalent states, etc.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A method for the treatment of exhaust gases containing detectible quantities of a multivalent heavy metal in a high oxidation state which comprises:
   a. introducing sulfur dioxide into contact with the exhaust gases, the sulfur dioxide being introduced in amounts from 1 to 10 times the stoichiometric quantity necessary for reducing said multivalent heavy metal into a lower oxidation state;

b. maintaining the contact of said sulfur dioxide with said exhaust gases under acidic conditions to favor the reduction of said heavy metal into a lower oxidation state and produce a compound of sulfur in a higher oxidation state than in said sulfur dioxide;

c. treating the exhaust gases containing said heavy metal in a lower oxidation state and residual sulfur dioxide and compound of sulfur to remove said sulfur dioxide and compound of sulfur from said exhaust gases; and d. passing said exhaust gases containing said heavy metal in a lower oxidation state into the atmosphere.

2. The method of claim 1 wherein said treatment of step (c) is performed by passing said exhaust gases into contact with an aqueous alkaline solution.

3. The method of claim 2 wherein sulfur dioxide is added in amounts from 1 to 3 times the stoichiometric quantity necessary for said reduction.

4. The method of claim 1 wherein said sulfur dioxide and exhaust gases are maintained in contact at temperatures from 75° to about 700° F.

5. The method of claim 1 wherein said heavy metal is chromium which is present in its hexavalent state.

6. The method of claim 1 wherein said heavy metal is chromium present in its hexavalent state, and wherein said chromium is reduced to its trivalent state by said contacting with sulfur dioxide.

7. The method of claim 5 wherein said exhaust gases are obtained as the exhaust from chromium plating operations.

8. A method for the treatment of exhaust gases containing detectible quantities of a multivalent heavy metal in a high oxidation state which comprises:

a. introducing an alkali metal bisulfite which is dissolved in an aqueous solution into contact with the exhaust gases;

b. maintaining the contact of said alkali metal bisulfite with said exhaust gases under acidic conditions to favor the reduction of said heavy metal into a lower oxidation state and produce a compound of sulfur in a higher oxidation state than in said alkali metal bisulfite;

c. treating the exhaust gases containing said heavy metal in a lower oxidation state and residual alkali metal bisulfite and compound of sulfur to remove said alkali metal bisulfite and compound of sulfur from said exhaust gases; and d. passing said exhaust gases containing said heavy metal in a lower oxidation state into the atmosphere.

9. The method of claim 8 wherein said aqueous solution of an alkali metal bisulfite is contacted with said exhaust gases by passing the solution in countercurrent contact with said exhaust gases.

* * * * *